T. H. PARKER, S. G. GASSAWAY, AND J. W. WHITSON.
CENTRIFUGAL FILTER.
APPLICATION FILED FEB. 21, 1920.
1,411,582.
Patented Apr. 4, 1922.
2 SHEETS—SHEET 1.
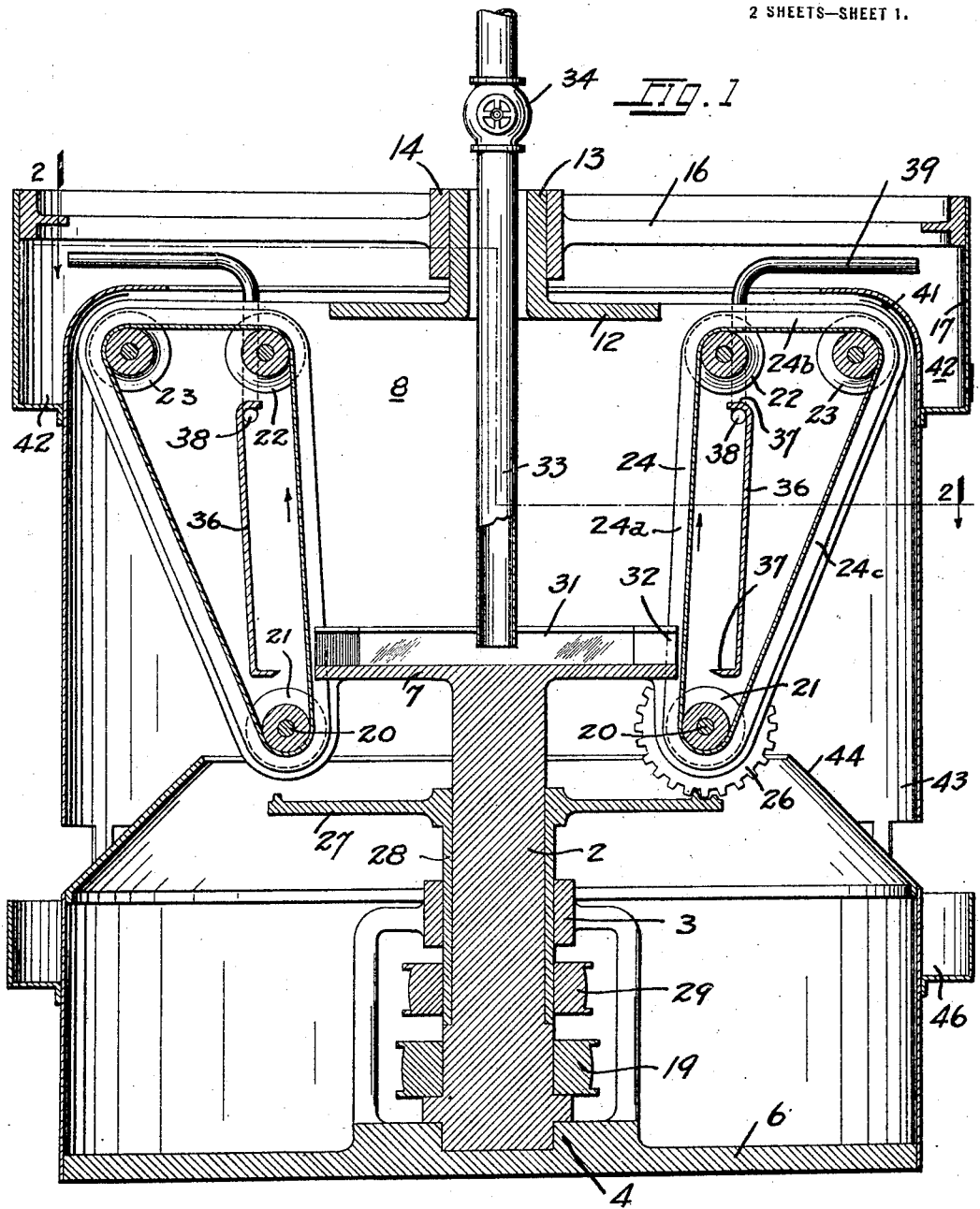
Witness:
C. S. Evans
Inventors
T. H. Parker.
and S. G. Gassaway.
J. W. Whitson.
by White & Prost
their attorneys.

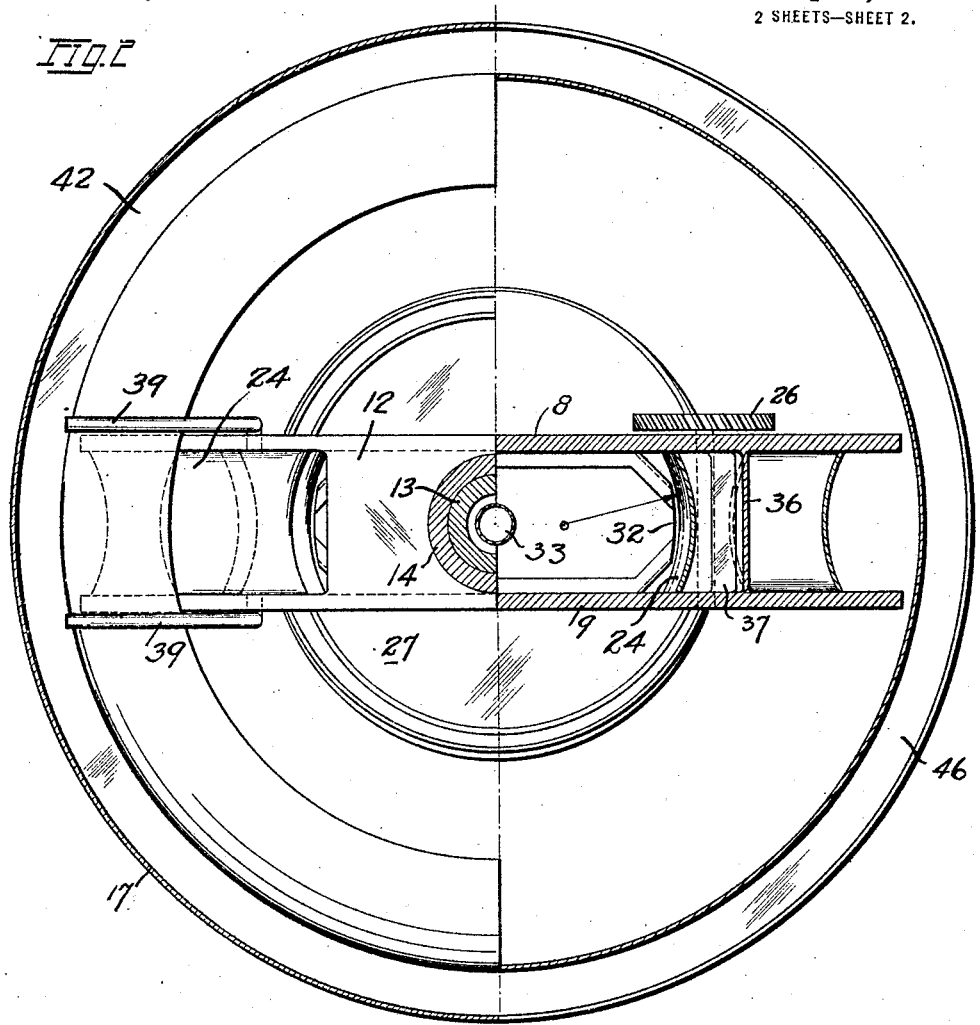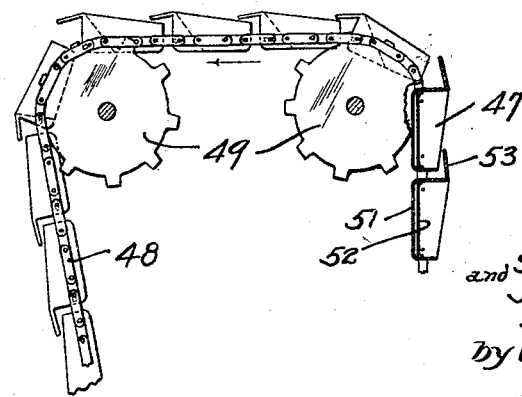

UNITED STATES PATENT OFFICE.

THOMAS H. PARKER, OF OAKLAND, STEPHEN G. GASSAWAY, OF BELVEDERE, AND JOHN W. WHITSON, OF SAN FRANCISCO, CALIFORNIA; SAID WHITSON ASSIGNOR TO SAID PARKER AND SAID GASSAWAY.

CENTRIFUGAL FILTER.

1,411,582.  Specification of Letters Patent.  Patented Apr. 4, 1922.

Application filed February 21, 1920. Serial No. 360,292.

*To all whom it may concern:*

Be it known that we, THOMAS H. PARKER, STEPHEN G. GASSAWAY, and JOHN W. WHITSON, citizens of the United States, and residents, respectively, of Oakland, Alameda County, Belvedere, Marin County, and the city and county of San Francisco, all in the State of California, have invented a new and useful Centrifugal Filter, of which the following is a specification.

Our invention relates to continuous filters or clarifiers for separating solids from liquids by the action of centrifugal force.

The chief object of our invention is to provide a filter in which the filtering medium is continuously being restored to effective condition.

Another object is the provision of a filter including a belt as the filtering medium and means for driving the belt and simultaneously rotating it bodily about an axis removed therefrom.

The invention possesses other objects and features of advantage, some of which, with the foregoing, will be set forth in the following description of the preferred form of our invention which is illustrated in the drawings accompanying and forming part of the specification. It is to be understood that we do not limit ourselves to the showing made by the said drawings and description, as we may adopt variations of the preferred form within the scope of our invention as set forth in the claims.

Referring to the drawings:

Figure 1 is a vertical sectional view through the center of the filter. Figure 2 is a horizontal sectional view, the planes of section being indicated by the line 2—2 of Figure 1. Figure 3 is a side elevation partly in section of a modified form of a portion of our invention.

In general terms our filter comprises a frame rotatable within a suitable housing. The frame is provided with two or more belts which comprise the filtering medium. Each of these belts is arranged with a reach lying in a plane parallel, or nearly parallel, to the axis about which the belts as a whole revolve, and means are provided for feeding material to be filtered upon these portions of the belts. During the movement of the material on the loading reach the filtrate under the influence of centrifugal force passes through the filtering medium comprising the belt and is centrifugally impelled through a discharge passage, the unfilterable material being thrown from the belt by centrifugal force as it turns out of the loading reach, leaving the filtering medium clean and filterably active and unimpaired as it again turns into the inner or loading reach of the belt.

In detail the filter of our invention comprises a preferably vertical shaft 2 journaled in suitable bearings 3 and 4 arranged on the bed plate 6. Fixed on the shaft is a frame comprising the horizontal plate 7 on which spaced vertical side plates 8 and 9 are fixed. At the top, the plates are connected by a horizontal web 12, on which is formed the hollow journal 13, axially alined with the shaft 2 and seated in bearing 14. This bearing is formed in the center of spider 16, which is supported by the casing 17, arranged at the top of the main housing 18. The frame is symmetrical in respect of the axis of rotation of the shaft so that the shaft and frame may be rotated at a high velocity by suitable power connections with the pulley 19, fixed on the lower end of the shaft.

Rotatably mounted on shaft 20 journaled in the lower portion of the frame on each side is a pulley 21. Mounted for rotation in the upper portion of the frame on each side are pulleys 22 and 23. The pulleys 21, 22 and 23 are concave or spool-like and carry a fabric belt 24 which comprises the filtering medium. The belt, as shown in Fig. 2, conforms to the shape of the pulleys and is substantially the width of the space between the plates 8 and 9. The location of the pulleys is such that the inner reach $24^a$ of the belt preferably inclines a small amount from parallelism with the axis of rotation of the frame; the upper reach $24^b$ of the belt is substantially perpendicular to the axis of rotation; and the outer reach $24^c$ slopes downwardly and inwardly. We may, however, locate pulleys 21 and 22 so that the inner reach $24^a$ of the belt is in a plane parallel to the axis of rotation of the frame. For convenience, the inner reach of the belt may be described as substantially parallel to such rotational axis, and these terms are understood to include a position of parallelism as well as positions somewhat deviating therefrom. As shown in Fig. 2, the curvature of the pulleys and of the transverse section of the belt lying thereon, is of a radius considerably less than the distance separating the inner reach of the belt and the axis of rotation of the frame, so that a cake of unfilterable material, necessarily forming with an inner curved surface concentric with the axis of rotation, may be built up on the belt.

While centrifugal force, acting on the accumulation of unfilterable material lying upon the outwardly sloping inner reach of belt, tends to cause movement of the belt, we prefer to supplement this driving force with mechanical means for driving the belt in the direction indicated by the arrows. On the outer end of shaft 20 is fixed a worm wheel 26 meshed with disk worm 27 which is mounted concentric with the shaft 2 on the sleeve 28 which surrounds the shaft and is interposed between it and bearing 3. A pulley 29 connectible to any suitable source of power is fixed on the sleeve, and when rotated effects, through the mediate connections, the rotation of the shaft 20 and the movement of the belt. Of course, the disk worm 27 may be fixed in position, the worm 26 being turned as a result of its bodily rotation with the shaft 2 and relative to the disk, but we find that a nicer regulation of the speed of the belt 24 may be effected by the separate driving of the disk worm independent of the rotation of the shaft.

Means are provided for feeding material to be filtered upon the belts 24. A conductor 31, tapered at the ends to provide a restricted discharge orifice 32 closely adjacent the belt 24, and near the lower end of the inner reach, is fixed on the plate 7 of the frame. A fixed feed pipe 33 is disposed on the axis of rotation of the frame, passing without contact through the hollow journal 13 and the upper wall of the conductor 31 and terminating just within the conductor. The feed pipe is provided with a valve 34 for regulating the quantity of material delivered into the conductor 31.

Means are provided for catching and centrifugally discharging the filtrate. Connecting the side walls 8 and 9 of the frame on each side behind the inner reach of the belt 24 is a nearly vertical wall 36 provided with flanges 37 at the top and bottom to form a shallow catch pan. The lower flange is slightly below the level of the discharge orifices 32 so that filtrate will not escape below the edge of the catch pan. The inclination of the pan from the vertical is such that liquid caught therein flows upwardly during the rotation of the frame to an aperture 38 opening into the discharge pipe 39 fixed on the frame. The pipe curves over the inwardly extending flange 41 of the main housing and discharges into the launder 42 formed between the casing 17 and the housing.

The unfilterable material, remaining in the hollow of the belt after the separation of the filtrate, is carried upwardly, and as it passes on to the upper or horizontal reach, the bulk of it is thrown off by centrifugal force, impinging against the inwardly curving flange 41 of the housing and falling into the internal launder 43 formed between the conical wall 44 and the housing, and from thence through appropriately disposed openings in the housing into the launder 46. After the filter belt passes over pulley 23 the force of gravitation, as well as centrifugal force, tends to remove any unfilterable material adhering thereto, so that by the time the belt turns again into the inner reach, it is free of all adhering particles and its filtering qualities have been completely restored. Thus, during the operation of the machine, a completely restored filtering medium continuously passes the point at which material discharging from the orifice 32 impinges thereon. Our filter is, therefore, capable of continuous operation with unimpaired filtering qualities and perfect uniformity of result.

It is quite obvious, without detailed description, that although in the present embodiment of our invention but two diametrically disposed filtering belts are shown, a larger number of belts may be spaced circumferentially about a suitably modified frame, each belt functioning in the manner made clear herein.

In Fig. 3 we have shown a modified form of belt in which shallow buckets 47 are pivotally mounted between twin chains 48 adapted to run over sprockets 49, which are substituted for pulleys 21—22—23. The bottoms 51 of the buckets are foraminated and provided with a suitable filtering medium 52, and each bucket is formed with a lip 53 sloping inwardly over the adjacent wall of the preceding bucket, so that no material can pass between the buckets. As the buckets turn into the horizontal reach of the chains, the unfilterable material therein is driven toward the front edge thereof, and as they turn downwardly they are completely discharged of remaining cake.

We claim:

1. In a centrifugal filter, a concave belt comprising a filtering medium, means for rotating said belt about an axis removed therefrom, and means for driving said belt.

2. In a centrifugal filter, a belt comprising a filtering medium, means for rotating said belt about an axis removed therefrom, means for feeding material to be filtered upon said belt, and means for effecting a continuous movement of said belt past the point at which said material impinges thereon and for concaving its face.

3. In a centrifugal filter, a filtering medium, means for rotating said medium about an axis, means for feeding material to be filtered upon said medium, concave means for moving said medium past the point at which said material impinges thereon, and means for catching and centrifugally discharging the filtrate.

4. A centrifugal filter comprising a shaft, a frame fixed on said shaft, concave-face pulleys disposed in said frame, a belt comprising a filtering medium arranged about said pulleys, a conductor for material to be filtered rotatable with said shaft and opening upon said belt, and means for rotating said shaft.

5. A centrifugal filter comprising a shaft, a frame fixed on said shaft, pulleys disposed in said frame, a belt comprising a filtering medium arranged about said pulleys and forming a trough-like channel, a conductor for material to be filtered rotatable with said shaft and opening upon said belt, means for rotating said shaft, and means for turning one of said pulleys to drive said belt.

6. A centrifugal filter comprising a shaft, a frame fixed on said shaft, pulleys disposed in said frame, a belt comprising a filtering medium arranged about said pulleys, a radial conductor, for material to be filtered at the top of and rotatable with said shaft and opening upon said belt, and means for rotating said shaft.

7. A centrifugal filter comprising a shaft, a frame fixed on said shaft, pulleys disposed in said frame, a belt comprising a filtering medium arranged about said pulleys, a conductor for material to be filtered rotatable with said shaft and opening upon said belt, means for rotating said shaft, means for turning one of said pulleys to drive said belt, a housing surrounding said rotating frame for catching the unfilterable material discharged from said filtering medium, a launder formed about the upper portion of said housing, and means in said frame for catching and centrifugally discharging into said launder the filtrate passing through said filtering medium.

In testimony whereof, we have hereunto set our hands at San Francisco, California, this 7th day of February, 1920.

THOMAS H. PARKER.
STEPHEN G. GASSAWAY.
JOHN W. WHITSON.

In presence of—
W. W. HEALEY,
M. E. EWING.